UNITED STATES PATENT OFFICE.

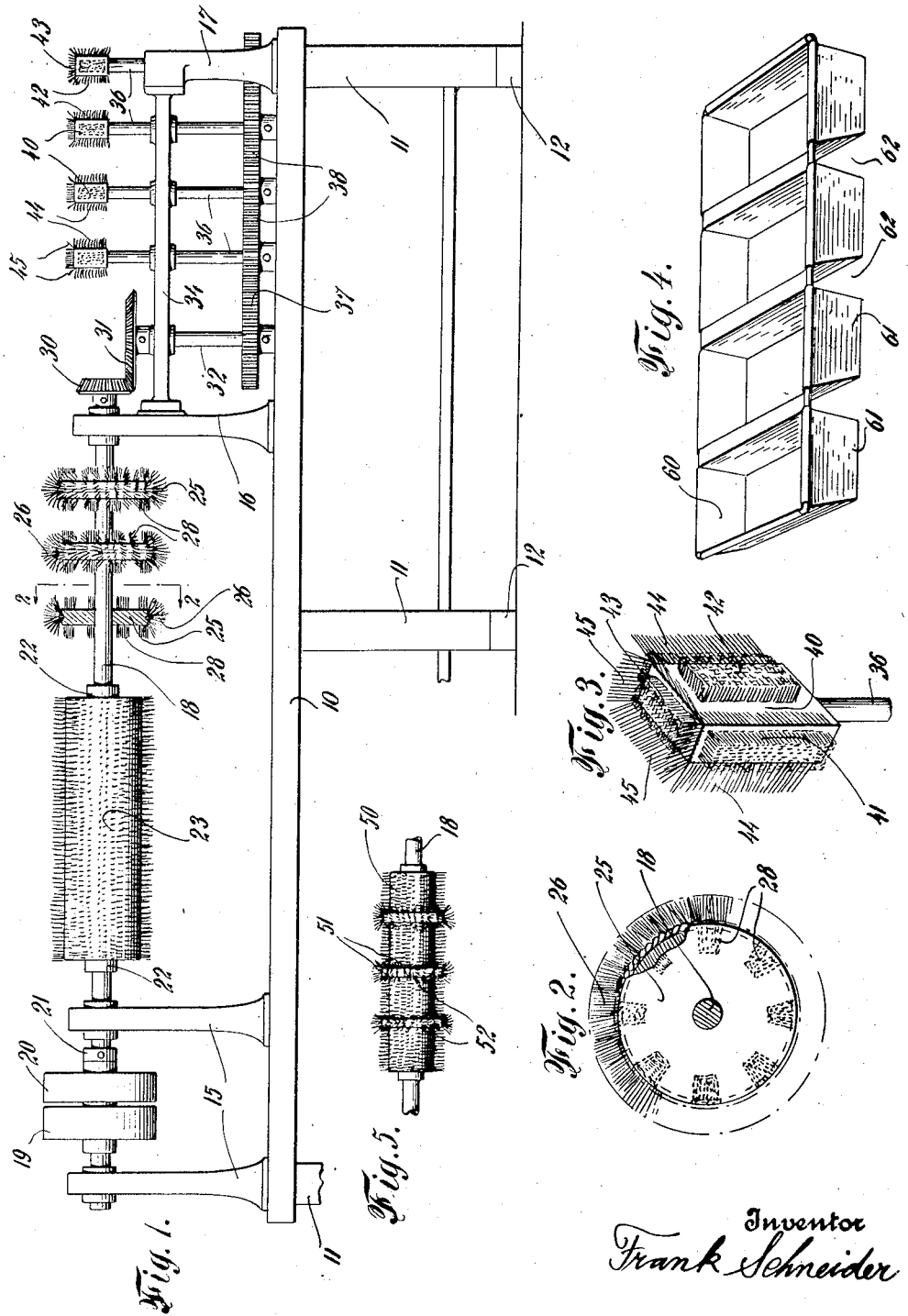

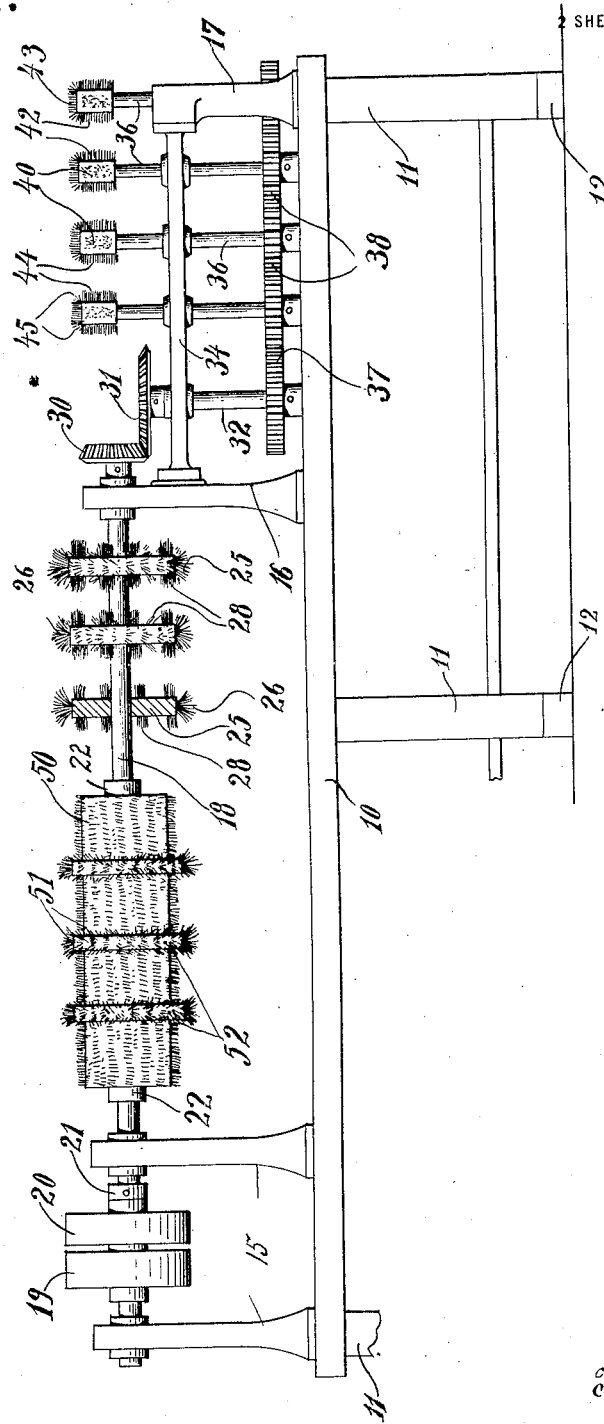

FRANK SCHNEIDER, OF BROOKLYN, NEW YORK.

BREAD-BAKING-PAN CLEANING AND POLISHING DEVICE.

1,329,931.  Specification of Letters Patent.  Patented Feb. 3, 1920.

Application filed March 24, 1919. Serial No. 284,813.

*To all whom it may concern:*

Be it known that I, FRANK SCHNEIDER, a citizen of the United States, and resident of Brooklyn, in the county of Kings and State of New York, have invented certain new and useful Improvements in Bread-Baking-Pan Cleaning and Polishing Devices, of which the following is a specification.

This invention relates to improvements in devices for cleaning and polishing bake pans, particularly types such as are used in the oven baking of bread, cake and the like.

The principal object of the invention is to provide a device by means of which pans engaged in series, as ordinarily employed for such purposes, may be cleansed inside and out, not only of crumbs, but of grease and adherent particles of all kinds.

A further object is to provide such devices in forms which may be economically manufactured and used by unskilled labor in such manner as to produce rapid and satisfactory results, the apparatus being provided with brushes both for the interior and exterior of the bake pans.

These and other like objects are attained by the novel construction and combination of parts hereinafter described and shown in the accompanying drawings, forming a material part of this disclosure and in which—

Figure 1 is a side elevational view showing a machine provided with a plurality of brushes adapted for engagement with the surface of the pans, certain of the brushes being in a horizontal and others in a vertical plane.

Fig. 2 is an enlarged transverse sectional view taken on line 2—2 of Fig. 1.

Fig. 3 is a perspective view showing one of the brush heads as used within the interior of the pan.

Fig. 4 is a perspective view showing a plurality of the bread pans connected in series in the manner commonly used, and Fig. 5 is a fragmentary side elevational view showing an alternative form of the scrubbing brushes.

Fig. 6 is a side elevational view, similar to Fig. 1 with the brush illustrated in Fig. 5 substituted for the cylindrical brush.

Referring to the drawings, a platform 10, is seen to be mounted upon supports 11, arranged at its ends and center, the same resting upon cross-pieces 12, secured to the floor of the building in which the device is located.

Rising from the platform 10 at the left hand end, are a pair of standards 15, a similar standard 16 being arranged farther out upon the surface of the platform, which has as its right hand end a shorter standard 17.

Mounted in the standards 15 and 16 is a horizontal shaft 18, driven by pulleys 19 and 20, respectively tight and loose, the pulleys being positioned between the outer pair of uprights 16, and the loose pulley 20 held in place by a fixed collar 21.

Secured upon the shaft 18, by its extending hubs 22, is a cylindrical wire brush 23 adapted to rotate at a relatively high speed and to make superficial contact with the pans 61 which are fixed in intimate spaced relation, as best shown in Fig. 4, the rapidly rotating wire brush 23 acting to scrub and polish the outer surfaces of the pans 61.

Also secured upon the shaft 18 are a plurality of disks 25, having set in their peripheries brush wires 26, while extending laterally from the sides of the disks are wire brush tufts 28, these brushes being suited to enter the spaces 62 between the pans 61, throughly polishing and cleansing the surfaces, which are otherwise well nigh inaccessible.

Fixed upon the end of the shaft 18, extending through the upright 16, is a bevel pinion 30, meshing with a bevel gear 31, fixed on a vertical shaft 32, the upper end of the shaft being guided on a horizontal bar 34, secured at its ends in raised lugs formed upon the inner faces of the uprights 16 and 17 respectively. The lower ends of the shaft 32 rest in bearings formed in the platform 10.

A series of vertical shafts 36 are also mounted in spaced relation in bearings formed in the bar 34 and platform 10, the same being parallel with the shaft 32 and driven by the spur gear 37, fixed upon the shaft 32 and meshing with mating gears 38, fixed upon the shafts 36, which extend to a considerable height above the bar 34.

Secured to the upper ends of the shafts 36 are rectangular heads 40, having upon each of their four faces wire brush tufts 41 and 42, respectively upon the narrow and wide side of the head, other tufts 43 extending directly up from their tops, while engaged with each of the flat sides of the head, so as to stand laterally out of the corners, are rows of wires 44, similar upstanding wire elements 45, extending diagonally from the four upper edges of the head.

These heads are adapted to operate within the interior 60 of the pans 61 whereby the same may be thoroughly cleansed of all grease, adhering crumbs and the like, and it will be obvious that, due to the peculiar formation of the wires in the heads 40, all surfaces in the interior of the pans are readily reached and at a single operation, it being understood that the spacing of the shafts 36 agrees with the spacing or center distance of the pans 61 one from another.

In place of the brush and disks 25, use may be made of a cylindrical brush 50, the same being rigidly secured upon the shaft 18, while at uniformly spaced intervals are diametral enlargements 51 from which project lateral tufts 52, in addition to the peripheral tufts 53 so that when the pans are applied, the spaces 62 between adjacent pans are received on the enlargements, while the bottoms of the pans 61 come in contact with the tufts of the cylindrical brush 50, this construction being shown in Fig. 5.

From the foregoing it will be seen that a device has been presented whereby bake pans of the character described may be rapidly cleansed and polished in a thorough manner without the exertion of muscular effort and obviously the operation consumes but a small portion of time.

Having thus described my invention and set forth the manner of its construction, application and use, what I claim as new, and desire to secure by Letters Patent, is—

1. In a device of the class described, the combination with a frame having a platform and standards mounted on said platform, of a shaft journaled horizontally in said standards, means for conveying rotary motion to said shaft, a cylindrical wire brush on said shaft, tufted disks interposed at regular spaced intervals in said cylindrical brush, the diameter of said tufted disks being greater than said brush, a plurality of disks secured in spaced relations on said shaft, said disks having wire tufts extending laterally in both directions, and a tufted periphery formed therewith.

2. In a device of the class described, the combination with a horizontal shaft and means for rotation thereof, of a sectional cylindrical wire brush mounted on said shaft having enlarged elements between its sections, a plurality of uniformly spaced narrow brushes, a plurality of upright shafts, operative connections between the first named shaft and said upright shafts, and rectangular heads secured to said upright shafts, said rectangular heads being provided with laterally extending and end wire brushes adapted to make contact with the interior of articles presented thereto.

3. In a device for polishing bake pans, the combination with a stand, a horizontal shaft mounted therein, a cylindrical sectional wire brush on said shaft, said brush having diametrically enlarged brush elements between its several sections, a plurality of equally spaced disks having wire tufts extending laterally and radially therefrom, a plurality of vertical shafts, operative connections between said horizontal shaft and said vertical shafts, rectangular heads fixed upon said vertical shafts, wire tufts extending from each of the faces and outer ends of said rectangular heads, and rows of wire elements at each of the corner edges of said rectangular head, said heads being adapted to enter the openings within the pans when placed thereover.

Signed at Brooklyn in the county of Kings and State of New York this the 20th day of March A. D. 1919.

FRANK SCHNEIDER.